United States Patent
Luo et al.

(10) Patent No.: US 8,529,736 B2
(45) Date of Patent: Sep. 10, 2013

(54) SYSTEM AND METHOD FOR METAL CUTTING

(75) Inventors: Yuefeng Luo, Mechanicville, NY (US); William Edward Adis, Scotia, NY (US)

(73) Assignee: General Electric Company, Schenectady, NY (US)

( * ) Notice: Subject to any disclaimer, the term of this patent is extended or adjusted under 35 U.S.C. 154(b) by 602 days.

(21) Appl. No.: 12/787,270

(22) Filed: May 25, 2010

(65) Prior Publication Data
US 2011/0290663 A1 Dec. 1, 2011

(51) Int. Cl.
*B23H 7/00* (2006.01)
*B23H 3/00* (2006.01)
*C25F 7/00* (2006.01)

(52) U.S. Cl.
USPC .............. 204/224 M; 204/297.01; 205/640; 205/672; 205/666

(58) Field of Classification Search
USPC .................... 205/666–668, 654; 204/224 M
See application file for complete search history.

(56) References Cited

U.S. PATENT DOCUMENTS

| | | | |
|---|---|---|---|
| 3,130,138 A * | 4/1964 | Faust et al. | 205/654 |
| 4,052,284 A | 10/1977 | Schrader | |
| 4,256,555 A * | 3/1981 | Wilson et al. | 205/654 |
| 4,930,486 A * | 6/1990 | Kuromatsu | 205/662 |
| 4,943,346 A * | 7/1990 | Mattelin | 216/17 |
| 5,190,463 A | 3/1993 | Datta et al. | |
| 5,244,548 A * | 9/1993 | Bruns et al. | 428/598 |
| 5,476,575 A * | 12/1995 | Brophy et al. | 205/652 |
| 5,614,076 A * | 3/1997 | Brophy et al. | 205/666 |
| 5,900,134 A * | 5/1999 | Stenneler et al. | 205/640 |
| 6,251,257 B1 * | 6/2001 | Cochran | 205/640 |
| 7,419,164 B2 | 9/2008 | Awtar et al. | |

FOREIGN PATENT DOCUMENTS

| | | |
|---|---|---|
| EP | 1785651 A1 | 5/2007 |
| FR | 2893357 A1 | 5/2007 |
| GB | 2021645 A | 12/1979 |

OTHER PUBLICATIONS

Wang et al., "Principles and Application of Electrolytic Machining", National Defence Industry Press, Beijing, 2001.*
New Seal Technology for Stream Turbine; http://www.mhi.com.jp/en/power/service/steam/newseal/index.html; Mitsubishi Heavy Industries, LTD.
Oldfield; Keep it Cool! 38 Years of Gas-Turbine Research; SOUE News; http://www.soue.org.uk/souenews/issue7/osney.html.
Professional Plastics; www.professionalplastics.com.
Search Report and Written Opinion from EP Application No. 11167469.3 dated Oct. 5, 2012.

* cited by examiner

*Primary Examiner* — Nicholas A Smith
*Assistant Examiner* — Brian W Cohen
(74) *Attorney, Agent, or Firm* — Fletcher Yoder, P.C.

(57) ABSTRACT

According to various embodiment, a system includes an electrolytic cutting tool. The electrolytic cutting tool includes a first cathode configured to be positioned at a first gap away from a first side of a workpiece, a second cathode configured to be positioned at a second gap away from a second side of the workpiece. The first and second cathodes are positioned opposite from one another. The electrolytic cutting tool also includes a first electrolyte passage configured to flow a first electrolyte through the first gap between the first cathode and the workpiece, a second electrolyte passage configured to flow a second electrolyte through the second gap between the second cathode and the workpiece, and a power supply configured to flow current through the first gap and the second gap to cause electrolytic dissolution through the workpiece from both the first side and the second side.

19 Claims, 6 Drawing Sheets

SYSTEM AND METHOD FOR METAL CUTTING

BACKGROUND OF THE INVENTION

The subject matter disclosed herein relates to metal cutting, and, more particularly, to electrolytic cutting.

Rotary machines may be used in refineries, petrochemical plants, natural gas processing plants, or other industries. For example, steam turbines may convert thermal energy from pressurized steam into rotary motion. Seals may be disposed in various locations within steam turbines to help reduce leakage of steam to the atmosphere or from one section of the steam turbine to another. Certain types of seals may include thin metal plates arranged circumferentially around a rotating element of the steam turbine to help reduce steam leakage. The metal plates may be cut from a roll of sheet metal, or other types of thin metal. Several methods may be used for cutting sheet metal. The selection of a particular method may depend on a variety of considerations, such as cutting speed, accuracy, formation of burrs, and machine and production costs. Unfortunately, existing methods may have disadvantages in one or more of these areas, producing excessive burrs and/or nonsymmetrical edges.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an electrolytic cutting tool. The electrolytic cutting tool includes a first cathode configured to be positioned at a first gap away from a first side of a workpiece, a second cathode configured to be positioned at a second gap away from a second side of the workpiece. The first and second cathodes are positioned opposite from one another. The electrolytic cutting tool also includes a first electrolyte passage configured to flow a first electrolyte through the first gap between the first cathode and the workpiece, a second electrolyte passage configured to flow a second electrolyte through the second gap between the second cathode and the workpiece, and a power supply configured to flow current through the first gap and the second gap to cause electrolytic dissolution through the workpiece from both the first side and the second side.

In a second embodiment, a method includes flowing a first electrolyte through a first electrolyte passage across a first gap between a first cathode and a first side of a workpiece, flowing a second electrolyte through a second electrolyte passage across a second gap between a second cathode and a second side of the workpiece. The first and second cathodes are positioned opposite from one another. The method also includes flowing current across the first gap and the second gap to cause electrolytic dissolution through the workpiece from both the first side and the second side.

In a third embodiment, a system includes a rotary machine and a plurality of compliant plate seals disposed in a circumferential arrangement in the rotary machine. Each compliant plate seal includes a metal sheet having an electrolytic pinch cut that is symmetrical relative to a central plane through the metal sheet.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed below, the disclosed embodiments provide systems and methods for electrolytic pinch cutting various workpieces, such as sheets, plates, generally flat structures, generally curved structures, or any other structures of uniform thickness. In particular, the electrolytic pinch cutting techniques apply a flow of electrolytes to opposite sides of the workpiece, thereby dissolving the workpiece from the opposite sides for a more symmetrical, uniform, and smooth cut through the workpiece. A compliant plate seal is one example of a workpiece that may be electrolytically pinch cut by the disclosed embodiments. The compliant plate seal may be configured to block leakage in an axial direction between a rotating member and a stationary element of a rotary machine, such as a compressor, a turbine, or a pump. Each compliant plate seal, also referred to as a leaf, may be a single metal sheet and many compliant plate seals may be stacked one on top of another in a circumferential manner around the rotating element. Groups of compliant plate seals may be arranged in packs to facilitate installation and removal. The compliant plate seals help to form a barrier to fluids (e.g., gases or liquids) that may leak axially with respect to the rotating element. In addition, the compliant plate seals may move and/or flex in a radial direction and thus, may help to reduce leakage during movement of the rotating element.

In certain embodiments, packs of compliant plate seals may include more than 1,000 seals, 5,000 seals, or even 10,000 seals. The thickness of each compliant plate seal may be between approximately 2.5 to 2,500 micrometer, 10 to 1,500 micrometer, or 25 to 250 micrometer. However, the number, geometry, and configuration of the compliant plate seals may vary from one application to another. The compliant plate seals may be cut in a variety of shapes to accommodate the particular geometry within the rotary machine. In addition, it may be desirable for the cutting process to produce edges of the compliant plate seals that are free of burrs, which are raised edges or small pieces of metal that remain attached because of certain cutting processes. Burr free edges may help prevent possible damage to the rotating element, reduce the introduction of debris into the rotary machine, and/or help create a regular and flexible pack of stacked compliant plate seals. A process referred to as deburring may subsequently remove burrs, but this introduces an additional step and cost in the production of compliant plate seals.

The presently disclosed embodiments employ electrolytic pinch cutting, or simply electrolytic cutting, to cut the metal sheets to avoid the disadvantages of other cutting methods, such as punching, laser cutting, water jet cutting, and photo edging. For example, electrolytic cutting produces edges that are burr-free, unlike punching and laser-cutting. In addition, electrolytic cutting may be faster than water jet cutting and photo etching. Moreover, electrolytic cutting may produce accurate and repeatable cuts without tool wear, as with punching. Furthermore, electrolytic cutting may be less expensive than laser cutting or photo etching. Finally, because electrolytes are applied to opposite sides of the workpiece, electrolytic cutting may produce symmetrical and uniform cuts that methods cutting from one side of the workpiece are incapable of. Thus, electrolytic cutting is ideally suited for cutting sheet metal for compliant plate seals.

Figure 1:
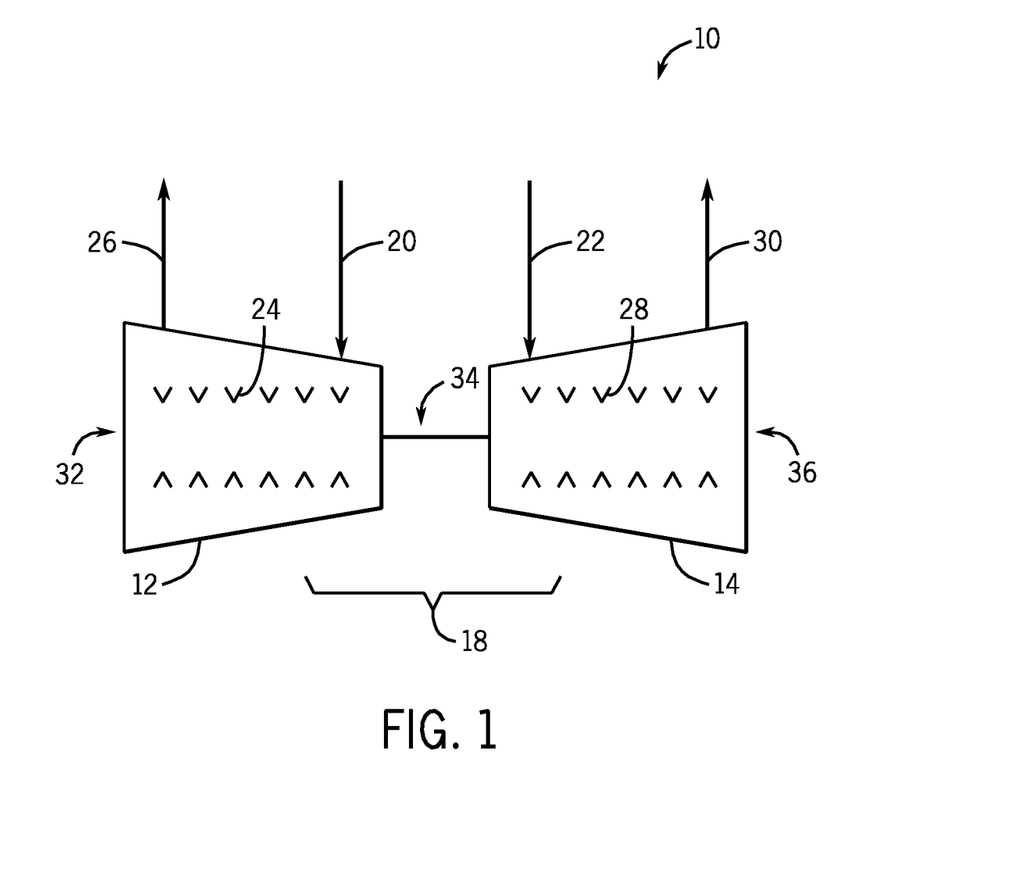
FIG. 1 is a cross-sectional side view of a steam turbine with compliant plate seals according to an embodiment.

FIG. 1 is a cross-sectional side view of a steam turbine 10 with compliant plate seals manufactured with electrolytic pinch cutting according to an embodiment. The steam turbine includes a high-pressure section 12 and an intermediate-pressure section 14. The steam turbine 10 also includes an outer casing 16. A central section 18 of the outer casing 16 may include a high-pressure steam inlet 20 through which high-pressure steam may be received by the high-pressure section 12 of the steam turbine 10. Similarly, the central section 18 of the outer casing 16 may include an intermediate-pressure steam inlet 22 through which intermediate-pressure steam may be received by the intermediate-pressure section 14 of the steam turbine 10.

During operation, the high-pressure steam inlet 20 receives and routes the high-pressure steam through high-pressure turbine stages 24, driving blades that cause rotation of a common rotor shaft of the steam turbine 10. The high-pressure steam exits the high-pressure section 12 of the steam turbine 10 through a high-pressure steam outlet 26. The exiting high-pressure steam may be used in the intermediate-pressure section 14 of the steam turbine 10.

The intermediate-pressure steam inlet 22 receives and routes the intermediate-pressure steam through intermediate-pressure turbine stages 28, driving blades that cause rotation of the common rotor shaft of the steam turbine 10. The intermediate-pressure steam exits the intermediate-pressure section 14 of the steam turbine 10 through an intermediate-pressure steam outlet 30. The exiting intermediate-pressure steam may be directed into a low-pressure section of the steam turbine 10.

The steam turbine 10 may include several shaft packing locations, which are generally used to minimize leakage of steam from the sections of the steam turbine 10. Particular embodiments of compliant plate seals may be installed in any of these shaft packing locations. For example, three such locations may include a high-pressure packing location 32, a mid-casing packing location 34, and an intermediate-pressure packing location 36. In general, the high-pressure packing location 32 is located near the high-pressure steam outlet 26 of the high-pressure section 12 of the steam turbine 10 and may reduce the amount of high-pressure steam leakage from the high-pressure section 12. Similarly, the intermediate-pressure packing location 36 is located near the intermediate-pressure steam outlet 30 of the intermediate-pressure section 14 of the steam turbine 10 and may reduce the amount of intermediate-pressure steam leakage from the intermediate-pressure section 14. The mid-casing packing location 34 is located near the central section 18 of the steam turbine 10 and may reduce the amount of high-pressure steam leakage from the high-pressure section 12 into the intermediate-pressure section 14. Other shaft packing locations may be associated with the low-pressure section of the steam turbine 10.

In certain embodiments, compliant plate seals may be installed in locations of the steam turbine 10 other than those discussed above. For example, compliant plate seals may be used at a bucket tip or a shaft seal location of the interstage locations of the steam turbine 10. In addition, compliant plate seals may be used in a packing ring or, alternatively, may be used directly in a packing head or stator structure. Compliant plate seals may be installed in nozzle assemblies, diaphragms, or singlet or blinglet assemblies. Furthermore, compliant plate seals may be used in gas turbine engines, hydroturbines, compressors, pumps, and any other type of rotary machine. As discussed below, each of the compliant plate seals is manufactured by electrolytic pinch cutting of the various openings and/or edges. As a result of the electrolytic dissolution of material from opposite sides of the plate, the resulting plate has a more uniform, symmetrical, and smooth cut.

Figure 2:
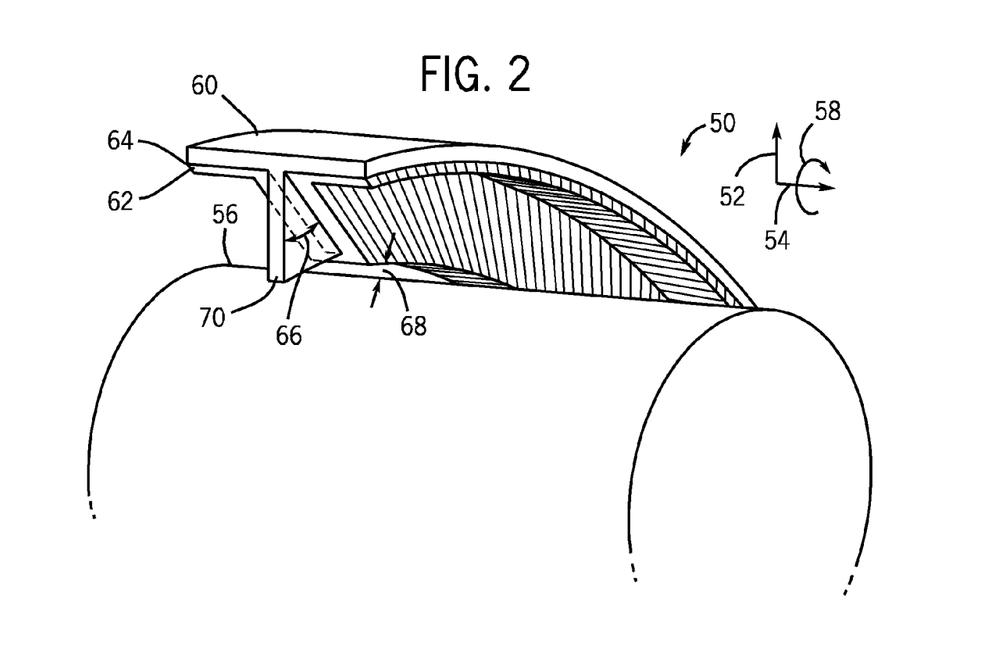
FIG. 2 is a partial perspective view of a compliant plate seal pack according to an embodiment.

Turning to one of the shaft packing locations of the steam turbine 10 in more detail, FIG. 2 is a partial perspective view of a compliant plate seal pack 50 electrolytically pinch cut according to an embodiment. In the illustrated embodiment, the radial direction is indicated by axis 52 and the axial direction is indicated by axis 54. A rotating element 56 rotates in the direction of arrow 58 about the axis 54. Circumferentially surrounding the rotating element 56 is a stator 60, which remains stationary with respect to the rotating element 56 during operation of the steam turbine 10. Attached to the stator 60 are one or more compliant plate seals 62. One end of the compliant plate seals 62 may be attached to the stator 60 at an interface 64 via welding, bolting, or other suitable fasteners. As discussed in detail above, the compliant plate seals 62 may be very thin, but are shown much thicker in FIG. 2 for clarity. For ease of installation and removal, the compliant plate seals 62 may be configured in packs of between approximately 1,000 to 50,000 seals, 2,500 to 25,000 seals, or 5,000 to 15,000 seals. Thus, a smaller number of packs, such as 2 to 10 packs, of compliant plate seals 62 may be installed circumferentially around the rotating element 56 rather than the large number of individual compliant plate seals 62. The compliant plate seals 62 are coupled to the stator 60 at an angle 66 from the radial axis 52, which enables the compliant plate seals 62 to move radially to accommodate movement of the rotating element 56 during operation of the steam turbine 10. For example, the angle 66 may range between approximately 0 to 90 degrees, 5 to 75 degrees, 10 to 60 degrees, or 15 to 30 degrees. In addition, because the compliant plate seals 62 are thin, they may also be able to flex radially. Furthermore, the compliant plate seals 62 are arranged such that a gap 68 exists between the tips of the compliant plate seals 62 and the surface of the rotating element 56. In other words, during operation the tips of the compliant plate seals 62 do not normally touch the rotating element 56. For example, the gap 68 may be between approximately 50 to 300 micrometer, 100 to 250 micrometer, or 150 to 200 micrometer.

In the illustrated embodiment of FIG. 2, the compliant plate seals 62 are T-shaped, with a portion removed (e.g., an opening or slot) from the vertical part of the T. The removed portion of the compliant plate seals 62 matches a vertical member 70, which may be configured as an annular ring coupled to the stator 60. The vertical member 70 may provide stability for the compliant plate seals 62 in the axial direction 54. In other words, the vertical member 70 helps to reduce flexure or bending of the compliant plate seals 62 in the axial direction 54 because of axial steam pressure. In addition, the vertical member 70 may act as a barrier to axial steam leakage. In other embodiments, the compliant plate seals 62 may be differently shaped and/or differently configured and the stator 60 may have additional vertical members 70 and/or other structures to provide stability for the compliant plate seals 62. For example, the compliant plate seal 62 may have additional removed portions to match additional vertical members 70.

Figure 3:
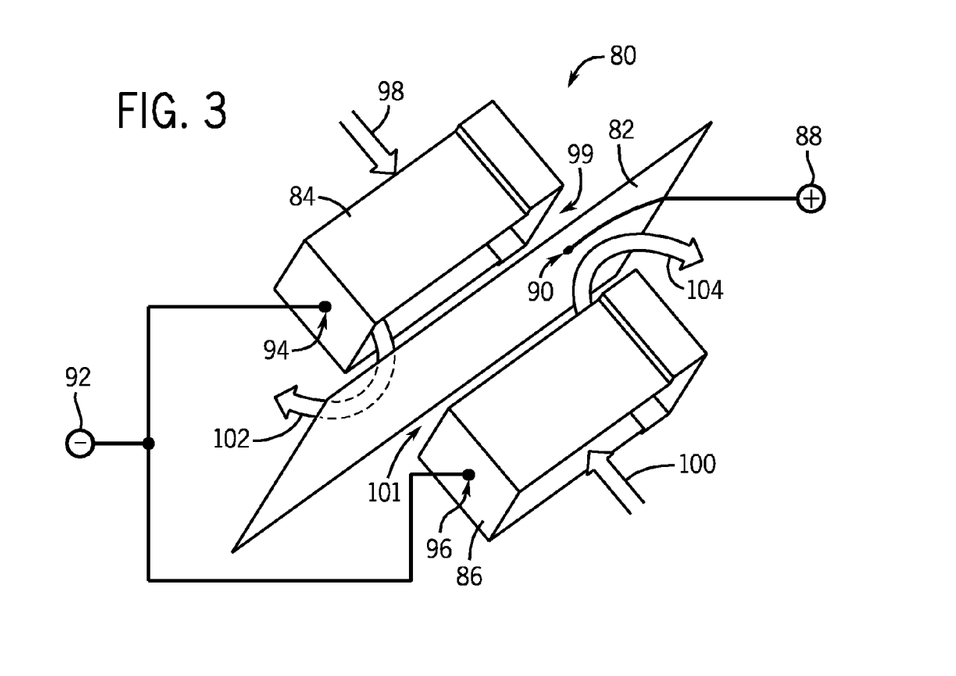
FIG. 3 is a perspective view of an electrolytic cutting system according to an embodiment.

With the preceding in mind, FIG. 3 is a perspective view of an embodiment of an electrolytic cutting system 80 that may be used to prepare the compliant plate seals 62, or any other seal body, seal structure, plate-type structure, or any other structures of uniform thickness. The electrolytic cutting system 80 may also be referred to as an electrolytic cutting tool. In the illustrated embodiment, a workpiece 82 may be a thin sheet of electrically conductive metal, such as, but not limited to, stainless steel or other cobalt or nickel based steel alloys. Individual sheets of metal may be introduced into the electrolytic cutting system 80 or a continuous roll of sheet metal may be unrolled and moved through the electrolytic cutting system 80 one segment at a time. An upper cathode 84 is configured on one side of the workpiece 82 and a lower cathode 86 is configured on the opposite side of the workpiece 82. The upper and lower cathodes 84 and 86 may be made from electrically conductive materials, such as, but not limited to, stainless steel, copper, brass, graphite, or copper-tungsten. In addition, the upper and lower cathodes 84 and 86 may be configured in the desired shape of the compliant plate seal 62 to be cut from the workpiece 82. In the illustrated embodiment, the upper and lower cathodes 84 and 86 may remain stationary with respect to the workpiece 82 during the electrolytic cutting process. However, in certain embodiments, the upper and lower cathodes 84 and 86 may move closer to the workpiece 82 as described in detail below. A positive pole 88 is coupled to the workpiece 82 at connection 90. Similarly, negative pole 92 is coupled to the upper cathode 84 at connection 94 and coupled to the lower cathode 86 at connection 96. The positive pole 88 and the negative pole 92 may be included in a power supply that delivers either direct current (DC), pulsating DC, or alternating current (AC) to the electrolytic cutting system 80. The amount of current passing through the positive and negative poles 88 and 92 is a function of the area of the workpiece 82 to be electrolytically cut. The voltage potential delivered across the positive and negative poles 88 and 92 may be between approximately 1 to 75 volt, 5 to 50 volt, or 10 to 30 volts. However, the voltage and current may vary depending on the workpiece material and geometry.

In addition to the structures described above, an electrolyte flows toward the upper cathode 84 as indicated by path 98 and is directed to an upper gap 99 between the upper cathode 84 and the workpiece 82. After passing through the upper gap 99, the electrolyte flows away from the workpiece 82 as indicated by path 102. Similarly, the electrolyte flows toward the lower cathode 86 as indicated by path 100 and is directed to a lower gap 101 between the lower cathode 86 and the workpiece 82. Subsequently, the electrolyte flows away from the workpiece 82 as indicated by path 104. Examples of electrolytes include, but are not limited to, sodium chloride dissolved in water and sodium nitrate dissolved in water. The same electrolyte may be used on both sides of the workpiece, or in certain embodiments, the electrolytes may be different. As electrical current passes through the electrolyte in the upper or lower gaps 99 or 101, metal from the workpiece 82 is electrolytically dissolved into metal hydroxide and is flushed away from the workpiece 82 by the electrolyte, as indicated by paths 102 or 104. Bubbles of hydrogen are also produced when the metal is electrolytically dissolved and the bubbles of hydrogen are flushed away with the metal hydroxide. Thus, metal is gradually dissolved from the upper and lower surfaces of the workpiece 82 near the edges of the upper and lower cathodes 84 and 86. As appreciated, the electrolytic cutting (or dissolving of metal) on both sides of the workpiece 82 increases the cutting speed, increases symmetry and uniformity of the cut, and reduces undesirable surface irregularities along the cut.

During electrolytic cutting, or also referred to as electrolytic dissolution, the upper and lower gaps 99 and 101 between the upper and lower cathodes 84 and 86 respectively are maintained and the upper and lower cathodes 84 and 86 do not contact the workpiece 82. If contact between the upper or lower cathodes 84 or 86 and the workpiece 82 did occur, electrolytic cutting would cease because of the resulting short circuit. When sufficient metal has been electrolytically dissolved from both sides of the workpiece 82, an opening forms in the workpiece resulting in an electrolytic cut in the shape of the upper and lower cathodes 84 and 86. Electrolytic cutting continues until the desired amount of metal is removed, which may take less than approximately 20 seconds, 10 seconds, or 3 seconds. However, the cutting time may vary depending on the workpiece material and thickness, the power supply, the electrolyte, and other factors. Once the power supply is disconnected, electrolytic cutting stops and the workpiece 82 may be removed. Although only one of the upper and lower cathodes 84 and 86 may be used to produce an electrolytic cut, by using both upper and lower cathodes 84 and 86, the metal dissolves from both sides of the workpiece 82 at about the same rate, resulting in a symmetrical edge, as discussed below. In addition, as described in more detail below, protective layers may be used on the workpiece 82 to protect certain portions from being electrolytically cut.

Figure 4:
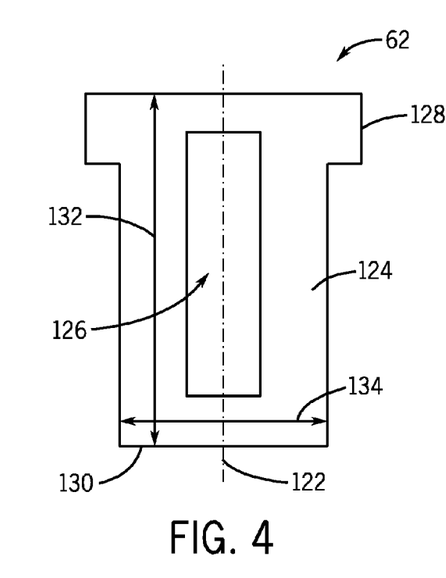
FIG. 4 is a front view of a compliant plate seal member produced by an electrolytic cutting system according to an embodiment.

FIG. 4 shows a front view of a compliant plate seal 62 produced using an embodiment of an electrolytic cutting system, such as that shown in FIG. 3. The compliant plate seal 62 may be symmetrical about an axis 122. In other embodiments, the compliant plate seal 62 may not be symmetrical or may be irregularly shaped. In the illustrated embodiment, an outer portion 124 of the compliant plate seal 62 includes sheet metal not dissolved by the electrolytic cutting process. In addition, the compliant plate seal 62 may include an inner portion 126 that has been electrolytically dissolved and thus, appears as an opening, hole, or slot in the compliant plate seal 62. The inner portion 126 may be configured with sides that are straight or curved and the inner portion 126 may be configured in suitable shapes, such as squares, ovals, triangles, rectangles, or other regular or irregular shapes. An upper portion 128 of the compliant plate seal 62 may be wider and/or differently shaped than the rest of the compliant plate seal 62 to facilitate coupling to the stator 60. A tip 130 of the compliant plate seal 62 may be oriented toward the rotating element 56 and, along with all the other edges of the compliant plate seal 62, is burr free. In other words, all the edges shown in FIG. 4 are burr free. In the illustrated embodiment, the height of the compliant plate seal 62 may be approximately 3 cm and the width may be approximately 2 cm. In other embodiments, the compliant plate seal 62 may be configured in different shapes, with different dimensions, and/or may not have an inner portion 126 to suit a particular application. Furthermore, the cuts produced by the electrolytic cutting system 80 may be straight or curved, depending on the shape of the cathodes and/or protective layers.

Figure 5:
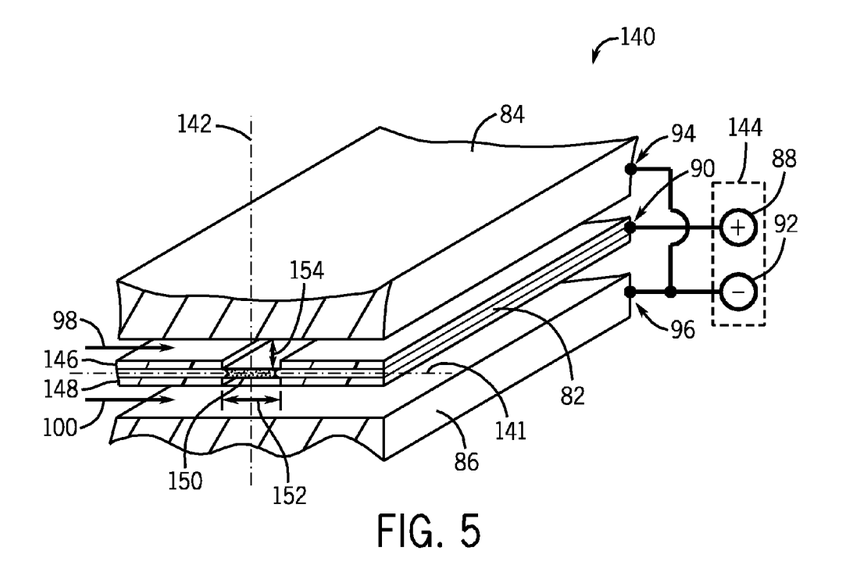
FIG. 5 is a cutaway perspective view of an embodiment of an electrolytic cutting system in which an electrolyte flows parallel to the workpiece.

Turning now to various configurations for electrolytic cutting systems, FIG. 5 is a partial perspective view of an embodiment of an electrolytic cutting system 140 with parallel flow paths of an electrolyte. Elements in common with those shown in FIG. 3 are labeled with the same reference numerals. In the illustrated embodiment, an axis 141 is oriented parallel to a plane through the workpiece 82 and an axis 142 is oriented perpendicular to the plane through the workpiece 82. The positive and negative poles 88 and 92 may be configured in a power supply 144. An upper protective layer 146 covers portions of the upper surface of the workpiece 82 and a lower protective layer 148 covers portions of the lower surface of the workpiece 82. The upper and lower protective layers 146 and 148 are made from non-conductive materials, which may include, but are not limited to, plastics and other insulating materials, and are affixed to the workpiece 82 using methods such, but not limited to, adhesives, clamps, or other fasteners. The portion of the workpiece 82 that is not covered by the upper and lower protective layers 146 and 148 is referred to as a kerf 150. A width 152 of the kerf 150 may be between approximately 15 to 800 micrometer, 20 to 600 micrometer, or 25 to 400 micrometer. Because the upper and lower protective layers 146 and 148 are both non-conductive, they protect the covered portions of the workpiece 82 from being electrolytically dissolved. Therefore, only the kerf 150 is electrolytically dissolved, which forms the cut through the workpiece 82. By using protective layers, the upper and lower cathodes 84 and 86 need not be shaped exactly like the desired pattern for the compliant plate seal 62.

In addition, as with the electrolytic cutting system 80 shown in FIG. 3, the upper and lower cathodes 84 and 86 face opposite sides of the workpiece 82 to help produce symmetrical edges adjacent to the kerf 150. In other words, the portion of the edge of the workpiece above axis 141 is symmetrical to the portion of the edge of the workpiece below axis 141. As illustrated in FIG. 5, the edges of the workpiece 82 are round and symmetrical about axis 141 adjacent to the kerf 150. The symmetrical edges may result because metal is electrolytically dissolved from opposite sides of the workpiece 82 and/or because about the same amount of metal is electrolytically dissolved from each side. For example, if the upper and lower cathodes 84 and 86 are being used simultaneously with approximately the same amount of current and the same electrolyte, the metal from the opposite sides of the workpiece 82 may electrolytically dissolve at about the same rate, resulting in symmetrical edges adjacent to the kerf 150 about the axis 141. Alternatively, if the upper cathode 84 is used with a certain current for a particular length of time and the lower cathode 86 is later used with about the same current for approximately the same length of time, the resulting edges adjacent to the kerf 150 may also be symmetrical about the axis 141. However, simultaneous electrolytic cutting from both sides may substantially improve the symmetry, uniformity, smoothness, and general quality of the cut. Workpieces 82 with round, symmetrical edges may be more likely to be free of burrs.

One difference between the electrolytic cutting system 140 and the electrolytic cutting system 80 shown in FIG. 3 is that the electrolyte flows in a direction parallel to the surface of the workpiece 82 and axis 141 through electrolyte passages as indicated by paths 98 and 100. Furthermore, the workpiece 82 may be rigid enough to support its own weight during electrolytic cutting. In some embodiments, the upper and lower protective layers 146 and 148 may be rigid enough to help support the workpiece 82. In other embodiments, non-conductive spacers may be disposed in the space between the upper cathode 84 and the upper protective layer 146 and the space between the lower cathode 86 and the lower protective layer 148. The spacers may help support the weight of the upper cathode 84 and the workpiece 82 during the electrolytic cutting process. Thus, the spacers may help maintain paths for the electrolyte to flow through. For example, a space 154 between the upper cathode 84 and the workpiece 82 (or the lower cathode 84 and the workpiece 82) may be between approximately 50 to 1,000 micrometer, 100 to 750 micrometer, or 200 to 500 micrometer. After the electrolytic cutting process is complete, the workpiece 82 may be removed from in between the upper and lower cathodes 84 and 86. At this time, the upper and lower protective layers 146 and 148 may be removed from the workpiece 82.

Figure 6:
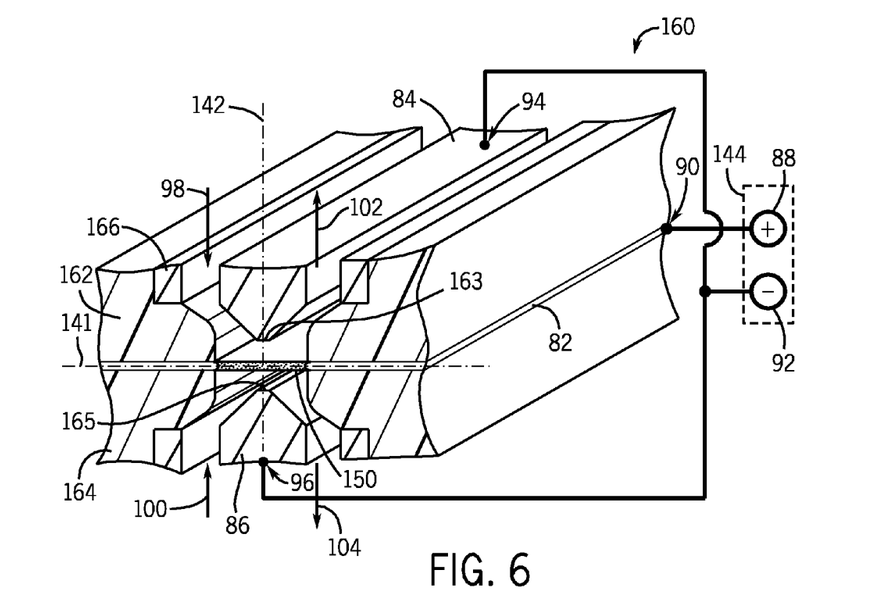
FIG. 6 is a cutaway perspective view of an embodiment of an electrolytic cutting system in which a workpiece is held by insulating clamps.

FIG. 6 shows a partial perspective view of an embodiment of an electrolytic cutting system 160 that uses electrically insulating clamps. Elements in common with those shown in earlier figures are labeled with the same reference numerals. In the illustrated embodiment, an upper insulator 162 and a lower insulator 164 are configured on opposite sides of the workpiece 82. The upper and lower insulators 162 and 164 are non-conductive and therefore, protect portions of the workpiece 82 that are not to be electrolytically cut. Thus, separate protective layers, such as those shown in FIG. 5, are not used in the embodiment of FIG. 6. In addition, the upper and lower insulators 162 and 164 may provide support for the workpiece 82 during electrolytic cutting. Examples of materials that may be used for the upper and lower insulators 162 and 164 include, but are not limited to, G-10 grade fiberglass and other engineering plastics. Supports 166 may be integrated into the upper and lower insulators 162 and 164 to provide additional strength and support. The supports 166 may be made from materials, such as, but not limited to, steel or other metals. Although the supports 166 may be conductive, the supports 166 may not electrolytically dissolve as they are coupled to negative pole 92 and are not located in between the upper and lower cathodes 84 and 86. Therefore, the upper and lower insulators 162 and 164 and the supports 166 work together as clamps to hold the workpiece 82 in place.

An advantage of using the upper and lower insulators 162 and 164 is that the upper and lower insulators 162 and 164 are not affixed to the workpiece 82 and thus, need not be removed from the workpiece 82 after electrolytic cutting. Furthermore, two differences between the electrolytic cutting system 160 of FIG. 6 and the electrolytic cutting system 140 of FIG. 5 are the shape of the cathodes and the electrolyte paths. In the illustrated embodiment of FIG. 6, the upper and lower cathodes 84 and 86 have pointed tips 163 and 165 directed toward the workpiece 82. The tips 163 and 165 may be tapered, wedge-shaped, or V-shaped as illustrated in FIG. 6, or the tips 163 and 165 may be narrow protrusions or curved shapes. The pointed tips 163 and 165 of the upper and lower cathodes 84 and 86 may enable the electrolytic cutting to occur faster and more accurately because the cutting is focused in the narrow area defined by the tips 163 and 165 of the upper and lower cathodes 84 and 86. Furthermore, the electrolyte is directed almost perpendicular to the surface of the workpiece 82 through electrolyte passages as indicated by paths 98 and 100 and exits almost perpendicular to the surface of the workpiece 82 through electrolyte passages as indicated by paths 102 and 104. Thus, the complete path of the electrolyte follows an almost U-shaped path or V-shaped path around the upper and lower cathodes 84 and 86. In addition, in the illustrated embodiment of FIG. 6, the electrolyte passage created between the upper and lower cathodes 84 and 86 and the upper and lower insulators 162 and 164 narrows closer to the workpiece 82. Such a narrow electrolyte passage may enable a greater current density and greater electrolyte flow rate in the vicinity of the workpiece 82. For example, the electrolyte flow rate may be greater than approximately 5 meter/second (m/s), 10 m/s, or 20 m/s. As with previously described embodiments, the electrolytic cutting in FIG. 6 occurs from both sides of the workpiece 82 to help provide a symmetrical cut.

Figure 7:
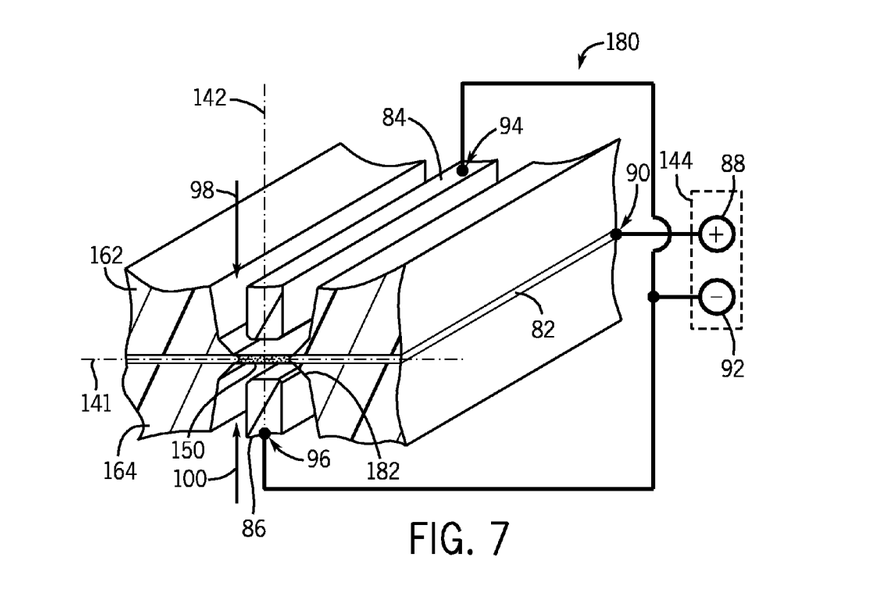
FIG. 7 is a cutaway perspective view of an embodiment of an electrolytic cutting system in which insulating clamps are shaped to obtain a desired edge for a workpiece.

FIG. 7 shows a partial perspective view of an embodiment of an electrolytic cutting system 180 with shaped insulating clamps. Elements in common with those shown in earlier figures are labeled with the same reference numerals. In the illustrated embodiment, the upper and lower insulators 162 and 164 are shaped with protrusions 182 that extend inward toward the kerf 150. For example, the protrusions 182 may be angled relative to the axis 141 of the workpiece 82, either with a flat or curved surface, such that the protrusions 182 guide the electrolyte flow at a suitable angle toward the workpiece 82. The protrusions 182 may help to further define the electrolyte passage and direct the electrolyte against the kerf 150 in a manner that defines the geometry of the cut. For example, the angle of the protrusions 182 may be increased or decreased to control the shape (e.g., curvature) of the cut on both sides of the workpiece 82. In addition, the protrusions 182 may enable the edges of the kerf 150 to be more rounded and symmetrical. One difference between the electrolytic cutting system 180 of FIG. 7 and the electrolytic cutting system 160 of FIG. 6 is that the upper and lower cathodes 84 and 86 do not have pointed tips. Wider or blunt tips for the upper and lower cathodes 84 and 86, such as those shown in FIG. 7, may be useful when cutting wider kerfs 150 because a larger area of the workpiece 82 is located between the upper and lower cathodes 84 and 86 to be electrolytically dissolved. Other aspects of the electrolytic system 180 are similar to those discussed above.

Figure 8:
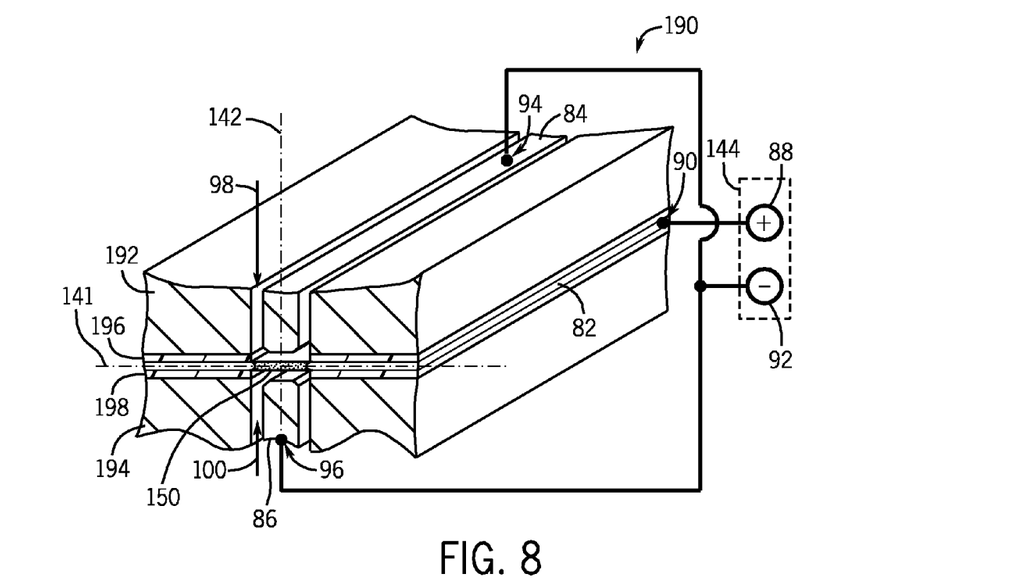
FIG. 8 is a cutaway perspective view of an embodiment of an electrolytic cutting system in which a workpiece is held by metal clamps with an intermediate insulating layer.

A partial perspective view of an embodiment of an electrolytic cutting system 190 with metal clamps is shown in FIG. 8. Elements in common with those shown in earlier figures are labeled with the same reference numerals. In the illustrated embodiment, an upper metal support 192 and a lower metal support 194 are used as clamps to hold the workpiece 82 in place during electrolytic cutting. An upper coating 196 and a lower coating 198 are provided on the surfaces of the upper and lower metal supports 192 and 194 respectively so that the upper and lower metal supports 192 and 194 are not electrolytically dissolved or electrically shorted to workpiece 82. The upper and lower coatings 196 and 198 are made from non-conductive materials, which may include, but are not limited to, polymers, ceramics, and other insulating materials. Although non-conductive layers 196 and 198 may be permanent coatings, the layers 196 and 198 may be removable non-conductive sheets, protective layers, or other implementations that electrically isolate the supports 192 and 194 from the workpiece 82. The upper and lower metal supports 192 and 194 may be stronger, more rigid and/or tougher than other non-metallic materials to help the electrolytic cutting system 190 to be more durable and long lasting. Other aspects of the electrolytic cutting system 190 are similar to those discussed above.

Figure 9:
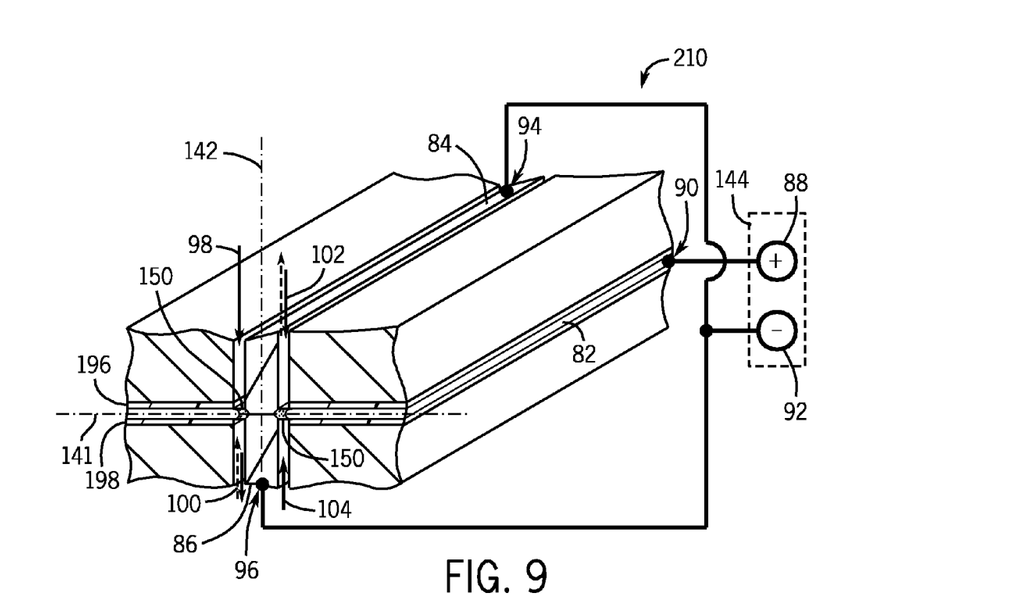
FIG. 9 is a cutaway perspective view of an embodiment of an electrolytic cutting system in which cathodes are capable of moving to achieve a desired edge for a workpiece.

FIG. 9 shows a partial perspective view of an embodiment of an electrolytic cutting system 210 with cathodes capable of movement. Elements in common with those shown in earlier figures are labeled with the same reference numerals. In the illustrated embodiment, the upper and lower cathodes 84 and 86 are configured to move toward one another about the workpiece 82. This movement of the upper and lower cathodes 84 and 86 may be performed after an initial portion of the kerf 150 is dissolved or immediately upon initiation of the cutting process. In either case, the cathodes 84 and 86 may move at a constant rate or a variable rate (e.g., increasing or decreasing rate) toward the workpiece 82. In addition, the cathodes 84 and 86 may move toward the workpiece 82 at equal or different rates. The rates of movement may be used to control the cutting speed as well as characteristics of the cut, e.g., symmetry, non-symmetry, angle, curve, etc. Upon contact with each other, the upper and lower cathodes 84 and 86 essentially form a single cathode. Subsequently, the remaining portion of the kerf 150 may be electrolytically dissolved. This process may be used when the kerf 150 is wide to help dissolve the portions of the workpiece 82 near the upper and lower coatings 196 and 198 faster for better close edge finishing. In addition, this process may be helpful when the workpiece 82 is relatively thick to enable a suitable gap to be maintained between the cathodes 84 and 86 and the surface of the workpiece 82 as metal is electrolytically dissolved. Before the upper and lower cathodes 84 and 86 touch, the electrolyte flows toward the workpiece 82 along paths 98 and 100 and flows away from the workpiece 82 along paths 102 and 104. Paths 100 and 102 are indicated by dashed arrows because after the upper and lower cathodes 84 and 86 touch, the directions of paths 100 and 102 reverse (as indicated by the solid arrows) as there are no longer two separate electrolyte passages on opposite sides of the workpiece 82. Instead, there are two electrolyte passages on either side of the touching upper and lower cathodes 84 and 86. Other aspects of the electrolytic cutting system 210 are similar to those discussed above.

Figure 10:
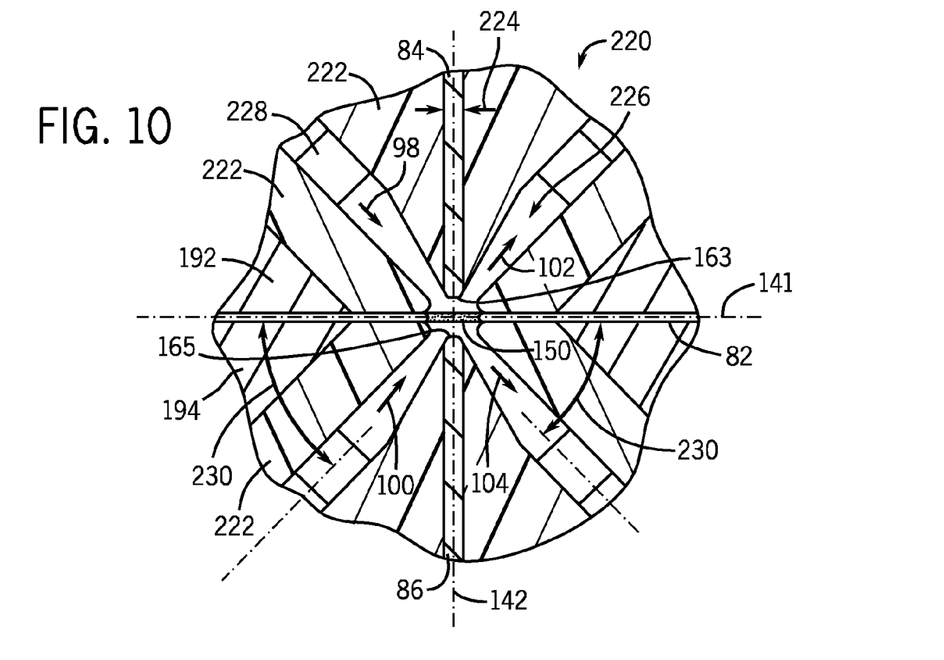
FIG. 10 is a cross-section of an embodiment of an electrolytic cutting system in which an electrolyte is directed toward a workpiece at an angle.

FIG. 10 shows a cross-section of an embodiment of an electrolytic cutting system 220 with electrolyte flowing at an angle to the workpiece. Elements in common with those shown in earlier figures are labeled with the same reference numerals. In the illustrated embodiment, the upper and lower cathodes 84 and 86 are disposed in insulating structures 222, except for the tips 163 and 165 facing the workpiece 82. A width 224 of the upper and lower cathodes 84 and 86 may be between approximately 50 to 500 micrometer, 100 to 400 micrometer, or 200 to 300 micrometer to enable smaller kerfs 150 to be electrolytically cut. The narrow width 224 of the upper and lower cathodes 84 and 86 may enable a more focused electrical field, resulting in a faster electrolytic cut. In addition, the upper and lower metal supports 192 and 194 are disposed in insulating structures 222, except for the surfaces away from the kerf 150. The upper and lower metal supports 192 and 194 may be connected to the positive pole 88 instead of making a direct connection between the workpiece 82 and the positive pole 88. Electrical continuity is maintained because the upper and lower metal supports 192 and 194 and workpiece 82 are all electrically conductive and in contact with one another. Spacers 228 maintain the width of the electrolyte passages 226 between the insulating structures 222 and lower metal supports 192 and 194. In addition, the spacers 228 transfer compression forces from the insulated upper and lower cathodes 84 and 86 to the upper and lower metal supports 192 and 194. The compression forces help to clamp the workpiece 82 in place. The spacers 228 may be made from either conducting or non-conducting materials, such as metals, plastics, or other insulating materials. The spacers 228 may be coupled to either the insulating structures 222 surrounding the upper and lower cathodes 84 and 86 or the upper and lower metal supports 192 and 194. In addition, hoses may be connected to the electrolyte passages 226 to supply electrolyte to the kerf 150.

In the illustrated embodiment of FIG. 10, the width of the electrolyte passages 226 narrows or converges as the electrolyte approaches the kerf 150. Such a configuration of the electrolyte passages 226 enables the electrolyte flow rate to increase approaching the kerf 150. Furthermore, the electrolyte passages 226 are oriented at an angle 230 from axis 141. Thus, the passages 226 may be V-shaped on each side of the workpiece 82. The angle 230 may contribute to less turbulence of the electrolyte flowing through the fluid passages 226 especially near the cathode tips 163 and 165. The angle 230 may be between approximately 0 to 90 degrees, 15 to 75 degrees, 30 to 60 degrees, or 40 to 50 degrees. Turbulence may cause eddies and flow separation of the electrolyte, resulting in uneven edges or slower electrolytic cutting. Thus, the illustrated electrolyte passages 226 may enable faster and more accurate electrolytic cuts to be achieved. In the illustrated embodiment, the electrolyte enters the electrolyte passages 226 at the angle 230 as indicated by paths 98 and 100 and exits the electrolyte passages 226 at the same angle 230 as indicated by paths 102 and 104. In other embodiments, the angles of the inlet and outlet electrolyte passages 230 may differ from one another. Other aspects of the electrolytic cutting system 220 are similar to those discussed above.

Figure 11:
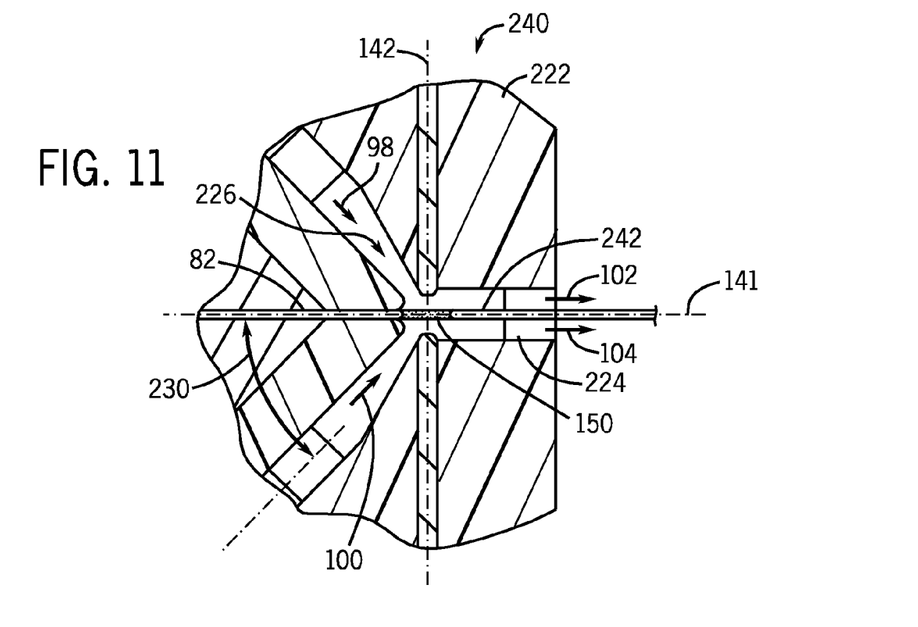
FIG. 11 is a cross-section of an embodiment of an electrolytic cutting system in which part of a workpiece is removed after cutting as scrap.

FIG. 11 shows a cross-section of an electrolytic cutting system 240 involving scrap. Elements in common with those shown in earlier figures are labeled with the same reference numerals. In certain electrolytic cutting systems 240, one side of the sheet metal is used as the compliant plate seal 62 and the other side is discarded or recycled as scrap. Therefore, the simpler structure of the electrolytic cutting system 240 may be used to produce the compliant plate seals 62. In the illustrated embodiment, the portion of the sheet metal to the left of axis 142 is the workpiece 82. The portion of the sheet metal to the right of the axis 142 is the scrap 242. The electrolyte enters the electrolyte passages 226 at the angle 230 as indicated by paths 98 and 100. However, at the kerf 150, the upper and lower paths 98 and 100 of electrolyte turn and move parallel to axis 141 as indicated by paths 102 and 104. The configuration of the electrolytic cutting system 240 to the left of the axis 142 allows for a burr free and symmetrical cut of the workpiece 82. Once the kerf 150 is electrolytically dissolved, the scrap 242 may be removed from the electrolytic cutting system 240. Other aspects of the electrolytic cutting system 220 are similar to those discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
 an electrolytic cutting tool, comprising:
  a first cathode configured to be positioned at a first gap away from a first side of a workpiece;
  a second cathode configured to be positioned at a second gap away from a second side of the workpiece, wherein the first and second cathodes are positioned opposite from one another
  a first electrolyte passage configured to flow a first electrolyte through the first gap between the first cathode and the workpiece;
  a second electrolyte passage configured to flow a second electrolyte through the second gap between the second cathode and the workpiece;
  a first support region configured to at least partially support the workpiece, wherein the first support region is flat;
  a second support region configured to at least partially support the workpiece, wherein the second support region is flat, and a distance between the first and second support regions is between approximately 15 to 800 micrometers;
  a cutting region configured to cut through the workpiece wherein the cutting region is configured to create a first portion of the workpiece physically separate from a second portion of the workpiece, the cutting region is disposed between the first and second support regions, and the first and second cathodes are disposed adjacent to the cutting region; and
 a power supply configured to flow current through the first gap and the second gap to cause an electrolytic cut through the workpiece from both the first side and the second side.

2. The system of claim 1, wherein the electrolytic cutting tool is a sheet metal cutting tool, and the workpiece is sheet metal.

3. The system of claim 1, wherein the electrolytic cutting tool is a seal cutting tool, and the workpiece is a seal body.

4. The system of claim 1, wherein the first cathode is disposed in a first insulative structure, and the second cathode is disposed in a second insulative structure.

5. The system of claim 1, wherein the first electrolyte passage comprises a first inward path directed toward the first gap and a first outward path directed away from the first gap, and the second electrolyte passage comprises a second inward path directed toward the second gap and a second outward path directed away from the second gap.

6. The system of claim 5, wherein the first inward path and the first outward path are generally parallel to the first side of the workpiece, and the second inward path and the second outward path are generally parallel to the second side of the workpiece.

7. The system of claim 5, wherein the first inward path and the first outward path are disposed at first angles relative to the first side of the workpiece, the second inward path and the second outward path are disposed at second angles relative to the second side of the workpiece, and the first and second angles are greater than 0 degrees and less than or equal to 90 degrees.

8. The system of claim 5, wherein at least a first one of the first inward path, the first outward path, the second inward path, or the second outward path is parallel to the first or second side of the workpiece, wherein at least a second one of the first inward path, the first outward path, the second inward path, or the second outward path is non-parallel to the first or second side of the workpiece.

9. The system of claim 1, wherein the first cathode is configured to move toward the first surface to reduce the first gap, and the second cathode is configured to move toward the second surface to reduce the second gap.

10. The system of claim 1, comprising a first protective layer configured to cover the first side of the workpiece except for a first uncovered portion at the first gap, and a second protective layer configured to cover the second side of the workpiece except for a second uncovered portion at the second gap.

11. The system of claim 10, wherein the first protective layer comprises a first clamp, the second protective layer comprises a second clamp, and the first and second clamps are configured to move toward one another to hold the workpiece.

12. The system of claim 10, wherein the first protective layer comprises a first electrical insulator configured to isolate the first electrolyte from the first side of the workpiece except for the first uncovered portion, and the second protective layer comprises a second electrical insulator configured to isolate the second electrolyte from the second side of the workpiece except for the second uncovered portion.

13. The system of claim 1, wherein the electrolytic cut comprises a non-linear electrolytic cut.

14. The system of claim 1, comprising a first spacer disposed in the first gap, wherein the first spacer is configured to maintain the first gap between the first cathode and the first side of the workpiece.

15. A system, comprising:
an electrolytic cutting tool, comprising:
a first cathode configured to be positioned at a first gap away from a first side of a workpiece;
a second cathode configured to be positioned at a second gap away from a second side of the workpiece, wherein the first and second cathodes are positioned opposite from one another
a first electrolyte passage configured to flow a first electrolyte through the first gap between the first cathode and the workpiece;
a second electrolyte passage configured to flow a second electrolyte through the second gap between the second cathode and the workpiece;
a power supply configured to flow current through the first gap and the second gap to cause an electrolytic cut through the workpiece from both the first side and the second side to create a first portion of the workpiece physically separate from a second portion of the workpiece wherein the first and second cathodes are disposed adjacent to the electrolytic cut;
a first support region configured to at least partially support the first side of the workpiece and the first portion after the electrolytic cut; and
a second support region configured to at least partially support the first side of the workpiece and the second portion after the electrolytic cut, wherein a distance between the first and second support regions is between approximately 15 to 800 micrometers, and the electrolytic cut is disposed between the first and second support regions.

16. The system of claim 1, comprising
a first electrical connection between the power supply and the first portion of the workpiece; and
a second electrical connection between the power supply and the second portion of the workpiece.

17. The system of claim 15, wherein the first support region is flat and the second support region is flat.

18. The system of claim 15, wherein the first cathode comprises a first non-linear cathode, the second cathode comprises a second non-linear cathode, and the power supply is configured to flow current through the first gap and the second gap to cause a non-linear electrolytic cut through the workpiece from both the first side and the second side.

19. A system, comprising:
an electrolytic cutting tool, comprising:
a first non-linear cathode configured to be positioned at a first gap away from a first side of a workpiece;
a second non-linear cathode configured to be positioned at a second gap away from a second side of the workpiece, wherein the first and second cathodes are positioned opposite from one another
a first electrolyte passage configured to flow a first electrolyte through the first gap between the first cathode and the workpiece;
a second electrolyte passage configured to flow a second electrolyte through the second gap between the second cathode and the workpiece;
a first support region configured to at least partially support the workpiece;
a second support region configured to at least partially support the workpiece, wherein a distance between the first and second support regions is between approximately 15 to 800 micrometers; and
a power supply configured to flow current through the first gap and the second gap to cause a non-linear electrolytic cut through the workpiece between the first and second support regions from both the first side and the second side to create a first portion of the workpiece physically separate from a second portion of the workpiece, wherein the first and second non-linear cathodes are disposed adjacent to the non-linear electrolytic cut.

* * * * *